United States Patent [19]

Proske

[11] 4,323,952
[45] Apr. 6, 1982

[54] REFLECTOR FOR VARYING ILLUMINATION DISTRIBUTION

[75] Inventor: Joachim Proske, Brunswick, Fed. Rep. of Germany

[73] Assignee: Rollei-Werke Franke & Heidecke GmbH & Co., Brunswick, Fed. Rep. of Germany

[21] Appl. No.: 154,968

[22] Filed: May 30, 1980

[30] Foreign Application Priority Data

Jun. 21, 1979 [DE] Fed. Rep. of Germany ....... 2924956

[51] Int. Cl.$^3$ ............................................. G03B 15/02
[52] U.S. Cl. ........................................ 362/17; 362/18; 362/276; 362/280; 362/308; 362/318
[58] Field of Search .................. 362/17, 18, 276, 280, 362/308, 318

[56] References Cited

U.S. PATENT DOCUMENTS 4,068,931  1/1978  Weaks ................................. 362/343

FOREIGN PATENT DOCUMENTS 1451066  9/1976  United Kingdom ................. 362/17

Primary Examiner—Stephen J. Lechert, Jr.
Attorney, Agent, or Firm—Staas & Halsey

[57] ABSTRACT

The angular distribution of illumination passing through a selectively diffusing element can be varied by placing the diffusing element in a reflector unit so that the diffusing element is in the path between a light source and the object to be illuminated. A variable diffuser can comprise a liquid-crystal cell driven by a variable voltage to control the amount of diffusion by the reflector unit. The control voltage can be set in accordance with change in focal length in a zoom lens of a camera using the light source and reflector unit as a flash gun.

3 Claims, 3 Drawing Figures

REFLECTOR FOR VARYING ILLUMINATION DISTRIBUTION

BACKGROUND OF THE INVENTION

1. Field of the Invention

Diffusers for a light source such as a flash gun varying the distribution of illumination on the subject being photographed.

2. Description of the Prior Art

Reflectors are known having devices for inserting diffusing panels which determine the illumination angle of the reflector. These devices of known construction have the drawback that the user must always have on hand a number of different diffusing panels and must always put in another diffusing panel when he wants to change the illumination angle.

In addition, reflectors are known having illumination angles which can be varied by a mechanical change of position relative to their light source. These devices have the disadvantage that they require costly mechanical devices for the necessary geometrical change of position. They also have the drawback that the change of position results in a change in the uniformity of illumination so that these devices are unsatisfactory for use with most illumination angles.

SUMMARY OF THE INVENTION

The primary object of this invention is to provide a reflector which can be employed for different illumination angles without a mechanical exchange of components and with a fixed disposition in relation to its light source.

This object is achieved according to the invention in that a controllable device is provided in the effective light emission surface of the light source and reflector unit for varying the light distribution.

The advantages of the invention lie in the fact that no extra components are needed that have to be exchanged and that the apparatus can function with optimum efficiency at all times. Furthermore, the invention has the advantage that the illumination can be varied on a continual basis and within the shortest possible time.

According to a preferred embodiment of the invention, the device for varying the light distribution has a controllable diffusion characteristic.

Preferably, this device may be a liquid-crystal cell.

According to a further development of the invention, this liquid-crystal cell is connected to the front panel of the reflector.

According to another preferred embodiment of the invention, the liquid-crystal cell is formed as a front panel.

Use of a liquid-crystal cell as a front panel of a reflector has the advantage that the variation of the angle of illumination or emission can be effected by changing the electrical voltage applied to the liquid-crystal cell.

The liquid-crystal cell may be of the nematic cell type, the "dynamic diffusion" effect of which is utilized. In nematic liquid crystals said effect is observed with a negative, dielectric anisotropy and with a specific resistivity ranging between approximately $10^9$ and $10$ ohm-cm. Above a certain threshold voltage said effect is detectable as a scattered or diffused light.

Below the threshold voltage the liquid-crystal cell is transparent. When the applied control voltage is increased to and beyond the value of the threshold voltage, the liquid-crystal cell changes to its diffusion state, the strength of the diffusion action depending on the strength of the control voltage. Therefore, by changing the control voltage above the value of the threshold voltage, one can vary the radiating performance of the reflector arrangement.

The invention comprises any type of reflector. In the case of very large reflectors, the front panel may contain several liquid-crystal cells.

In particular, the invention permits the production of electronic flash units with adjustable illumination angles. Particularly, in electronic flash units as may be employed in the present invention, there is the special advantage that the device for generating the control voltage can be coupled with the focal length of the lens in use. This may be used when varying the focal length in varifocal lenses or when exchanging lenses with fixed focal lengths. In particular, in cameras with varifocal lenses the geometrical shift when varying the distance setting can be transmitted to the tap of a potentiometer, from which the control voltage is tapped.

Other features and advantages of the invention will be better understood from the consideration of the ensuing description offered by way of non-limiting example, and from the attached drawings where:

DETAILED DESCRIPTION OF THE PREFERRED EMBODIMENTS

Figure 1:
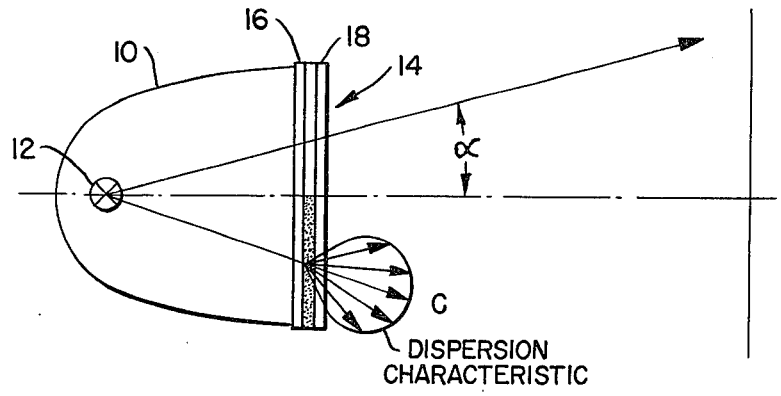
FIG. 1 is a schematic longitudinal section of a reflector using a liquid-crystal cell as a front panel.

The varifocal reflector for an electronic flash unit as shown in FIG. 1 essentially comprises a reflector segment 10 which surrounds a flash unit 12 and is covered at its front end by a front panel 14 in the form of a liquid-crystal cell. Said liquid-crystal cell is controlled by means of transparent electrodes 16 and 18. The liquid-crystal cell is of the nematic type with a negative dielectric anisotriopy and a specific resistivity between $10^9$ and $10^{13}$ ohm-cm.

Figure 2:
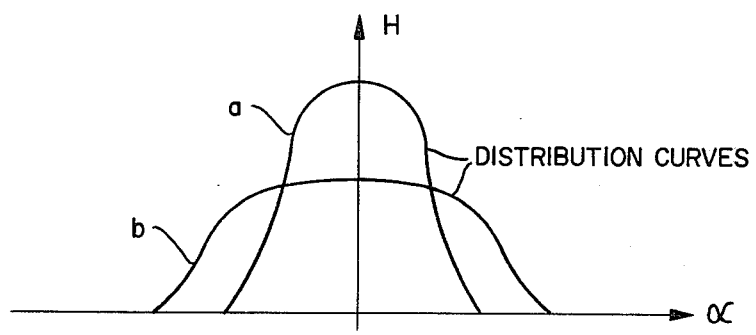
FIG. 2 shows various illumination curves.

If the voltage applied between the control electrodes 16 and 18 is below a certain threshold, the liquid-crystal cell is in its transparent state, as shown in FIG. 1 above the horizontal middle axis of the reflector. If the control voltage applied between the control electrodes 16 and 18 has exceeded the threshold value, the liquid-crystal cell changes to its diffusing state, as shown schematically below the horizontal line along the axis of the reflector in FIG. 1. In FIG. 2, the exposure H is shown as a function of the illumination angle α for two illumination curves a and b. The illumination curve a shows the light distribution curve of the varifocal reflector with a transparent front panel. The illumination curve b shows the light distribution of the varifocal reflector with a liquid-crystal cell which is in the diffuse scattering state.

In the case of a transparent front panel, the illumination or light distribution curve of the reflector is narrower and higher than the illumination curve in the case of a diffusion front panel. As can be seen from both figures, this variation can easily be effected by varying the electrical control voltage without changing the position of the flash tube 12 in relation to the reflector 10.

Said variation of the illumination curves can be effected continuously, since the electrical voltage can be varied continuously. Moreover, this variation of the illumination curves can be carried out very rapidly, since the electrical control voltage can also be easily and rapidly varied, for example, by means of an adjustable potentiometer.

Figure 3:
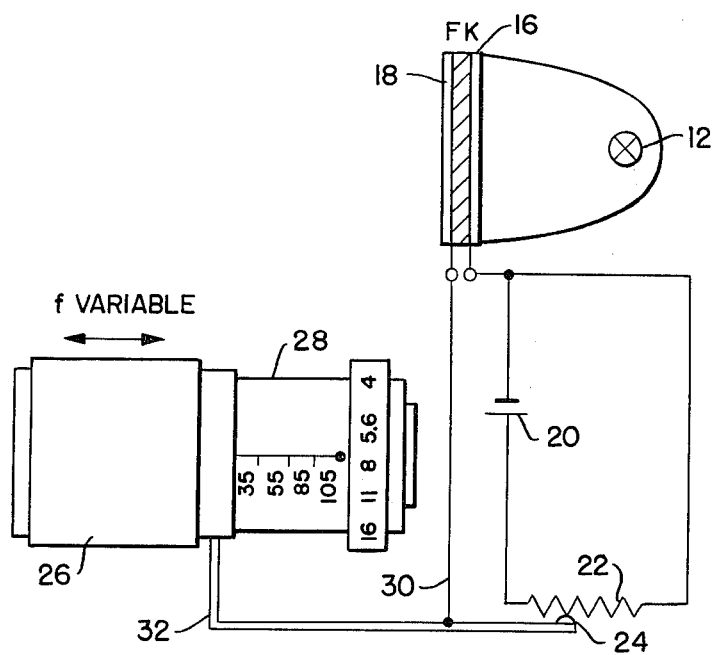
FIG. 3 shows geared and electrical connections between varifocal reflector and varifocal lens.

FIG. 3 is a schematic representation of a method of providing a connection between the relector and varifocal lens. In this embodiment, the control electrode 16 of the liquid-crystal cell FK is directly connected to the terminal of a direct voltage battery 20, which is connected via a resistor 22 to its other terminal. At the resistor there is arranged, with allowance for sliding, a center tap 24 which is connected via a linkage 32 with the barrel 26 of a varifocal lens. The sliding center tap 24 is connected via a flexible wire connection 30 to the other control electrode 18 of the liquid-crystal cell FK.

If the barrel 26 of the varifocal lens is moved to the right, for instance for taking a telephoto shot, the center tap 24 of this potentiometer circuit moves to the right in FIG. 3, thereby reducing the control voltage between the control electrodes 16 and 18, and the liquid-crystal cell becomes increasingly more transparent or it changes to its fully transparent state. On the other hand, if the barrel is moved out, the center tap 24 of the potentiometer circuit on the resistor 22 slides to the left and at the same time the control voltage of the liquid-crystal cell applied between the control electrodes 16 and 18 will increase, with the result that the liquid-crystal cell—after the threshold voltage has been exceeded—changes to an increasingly scattering or diffusing state.

While particular embodiments of the invention have been shown, it will be understood that the invention is not limited thereto since many modifications may be made, and it is therefore contemplated to cover by the appended claims any such modifications as fall within the true spirit and scope of the invention.

I claim:

1. A camera and flash unit combination, said camera having a lens system with a variable focal length, and said flash unit comprising
   a light source and a reflector mounted to effectively provide a front surface of said flash unit at which a selective portion of said light from said source is scattered, and
   means for selectively controlling the relative angular distribution of the light that is transmitted through said front surface, by generating a control voltage and applying said control voltage to said at least one liquid-crystal cell to control the amount of said scattering, including at least one nematic liquid-crystal cell located in said transmitting surface of said flash unit and means for adjusting the magnitude of said control voltage in accordance with the focal length of said lens system to provide the corresponding relative angular distribution.

2. The flash unit of claim 1, said lens system including a zoom lens system, said means for selectively controlling the relative angular distribution comprising
   a variable resistor and linkage means for changing the value of said variable resistor in correspondence to the focal length setting of said zoom lens system.

3. The flash unit of claim 2, said zoom lens system including means for adjusting said focal length by motion of one component of said zoom lens system along a predetermined direction,
   said variable resistor comprising a movable center tap, and
   said linkage means comprising a mechanical linkage between said movable component of said zoom lens and said movable center tap of said variable resistor.

* * * * *

UNITED STATES PATENT AND TRADEMARK OFFICE
CERTIFICATE OF CORRECTION

PATENT NO. : 4,323,952

DATED : 6 April 1982

INVENTOR(S) : Proske

It is certified that error appears in the above—identified patent and that said Letters Patent is hereby corrected as shown below:

Front page, [75] Inventor, "Brunswick" should be --Braunschweig--.
[73] Assignee, "Brunswick" should be --Braunschweig--.

Col. 1, line 62, "10—" should be --$10^{13}$--.
Col. 2, line 64, "diffusion" should be --diffusing--.
Col. 3, line 9, "relector" should be --reflector--.

Signed and Sealed this

Thirtieth Day of November 1982

[SEAL]

Attest:

GERALD J. MOSSINGHOFF

Attesting Officer

Commissioner of Patents and Trademarks